(12) United States Patent  
Shahroodi

(10) Patent No.: US 9,333,823 B2
(45) Date of Patent: May 10, 2016

(54) GRAVITATIONALLY ALIGNING WHEELS

(71) Applicant: Hossein Shahroodi, Lake Worth, FL (US)

(72) Inventor: Hossein Shahroodi, Lake Worth, FL (US)

(*) Notice: Subject to any disclaimer, the term of this patent is extended or adjusted under 35 U.S.C. 154(b) by 0 days.

(21) Appl. No.: 14/530,010

(22) Filed: Oct. 31, 2014

(65) Prior Publication Data

US 2015/0174977 A1     Jun. 25, 2015

Related U.S. Application Data

(63) Continuation-in-part of application No. 14/139,288, filed on Dec. 23, 2013.

(51) Int. Cl.
*B60D 1/66* (2006.01)
*B60B 33/00* (2006.01)

(52) U.S. Cl.
CPC ............... *B60D 1/665* (2013.01); *B60B 33/00* (2013.01); *B60B 33/0049* (2013.01); *B60B 2033/0031* (2013.01); *Y10T 16/203* (2015.01)

(58) Field of Classification Search
CPC ............ B60B 33/00; B60B 2033/0031; B60B 33/0049; B60D 1/665; B60S 9/14
See application file for complete search history.

(56) References Cited

U.S. PATENT DOCUMENTS

| | | |
|---|---|---|
| 189,897 A | 4/1877 | Mey |
| 568,025 A | 9/1896 | Graessle |
| 575,245 A | 1/1897 | Judkins |
| 606,462 A | 6/1898 | Kennedy-McGregor |
| 696,499 A | 4/1902 | Schaibly |
| 998,511 A | 7/1911 | Heron |
| 1,017,464 A | 2/1912 | Rae |
| 1,193,052 A | 8/1916 | Plrsch |

(Continued)

FOREIGN PATENT DOCUMENTS

| | | |
|---|---|---|
| CA | 1287618 | 8/1991 |
| CA | 2714926 | 3/2011 |

(Continued)

OTHER PUBLICATIONS

Power Jacks 3K & 4K Premier Performance Series Power Jacks—pp. 2, retrieved Oct. 31, 2014.

(Continued)

*Primary Examiner* — Joseph Rocca
*Assistant Examiner* — Marlon Arce
(74) *Attorney, Agent, or Firm* — Fleit Gibbons Gutman Bongini & Bianco PL; Gary S. Winer; Paul D. Bianco

(57) ABSTRACT

A trailer stand includes a wheel assembly and a carriage. The wheel assembly includes a bearing, a wheel rotatable in connection with the bearing to be rotatable in a first direction, but not rotatable in a second transverse direction, a pivot connectable to the object, and a frame connected to the pivot to be pivotable with respect to the object, the frame sized and dimensioned to support the bearing at an offset with respect to the pivot axis of the pivot to thereby form caster trail, the frame having a mass distributed unequally upon left and right sides of the wheel assembly, thereby causing the frame to pivot with respect to the Earth, to a predetermined orientation, when the frame is tilted with respect to a normal orientation with respect to the Earth. The carriage supports the wheel assembly, and is pivotable with respect to the trailer.

24 Claims, 10 Drawing Sheets

(56) References Cited

U.S. PATENT DOCUMENTS

| | | |
|---|---|---|
| 1,375,536 A | 4/1921 | Ostrander |
| 1,415,008 A | 5/1922 | Barber |
| 1,639,860 A | 8/1927 | Schultz |
| 1,733,536 A | 10/1929 | Guitschula |
| 1,796,044 A | 3/1931 | Nagy |
| 1,861,919 A | 6/1932 | Hill |
| 1,896,234 A | 2/1933 | Hathorn |
| 2,051,627 A | 8/1936 | Weinmann |
| 2,094,050 A | 9/1937 | Wachter |
| 2,096,229 A | 10/1937 | Dudley |
| 2,140,264 A | 12/1938 | Kingham |
| 2,153,722 A | 4/1939 | Loughmiller |
| 2,159,395 A | 5/1939 | Mersereau |
| 2,165,538 A | 7/1939 | Connors |
| 2,194,694 A | 3/1940 | Halley |
| 2,296,789 A | 8/1942 | Johnson |
| 2,335,946 A | 12/1943 | Klaus, Sr. |
| 2,359,488 A | 9/1944 | Black |
| 2,360,988 A | 10/1944 | Thomas |
| 2,388,308 A | 11/1945 | Court |
| 2,446,321 A | 4/1948 | Bartholomew |
| 2,459,508 A | 1/1949 | Dourte |
| 2,500,854 A | 3/1950 | Mullen et al. |
| 2,526,905 A | 10/1950 | Sartin |
| 2,560,704 A | 7/1951 | Sebel |
| 2,583,858 A | 1/1952 | Kostolecki |
| 2,595,453 A | 5/1952 | Gilmore |
| 2,608,416 A | 8/1952 | Frost |
| 2,627,424 A | 2/1953 | Chapin |
| 2,634,941 A | 4/1953 | Eckert |
| 2,638,315 A | 5/1953 | Wagner |
| 2,372,705 A | 4/1954 | Bicker |
| 2,683,277 A | 7/1954 | Bernaerts |
| 2,709,827 A | 7/1955 | Volz |
| 2,799,041 A | 7/1957 | Baker |
| 2,810,588 A | 10/1957 | Rozett |
| 2,837,312 A | 6/1958 | Troche |
| 2,851,250 A | 9/1958 | Hansen |
| 2,853,316 A | 9/1958 | Moss |
| 2,882,070 A | 4/1959 | Bill |
| 2,885,181 A | 5/1959 | McCully et al. |
| 2,947,021 A | 8/1960 | Black |
| 2,972,163 A | 2/1961 | Ross et al. |
| 2,976,055 A | 3/1961 | Harrison |
| 2,990,194 A | 6/1961 | Abolins |
| 3,031,037 A | 4/1962 | Stollman |
| 3,070,828 A | 1/1963 | Clinton et al. |
| 3,093,362 A | 6/1963 | Schaefer |
| 3,102,298 A | 9/1963 | Sheaham et al. |
| 3,106,382 A | 10/1963 | Georgi |
| 3,146,002 A | 8/1964 | Faber |
| 3,158,881 A | 12/1964 | Clausen |
| 3,248,084 A | 4/1966 | Hammond |
| 3,273,858 A | 9/1966 | Coburn |
| 3,281,160 A | 10/1966 | Vinther et al. |
| 3,298,467 A | 1/1967 | Darnell |
| 3,314,692 A | 4/1967 | Karns |
| 3,332,661 A | 7/1967 | Hand |
| 3,358,792 A | 12/1967 | Proulx |
| 3,362,683 A | 1/1968 | Hansen |
| 3,405,955 A | 10/1968 | Schuler |
| 3,458,173 A | 7/1969 | Kornovich et al. |
| 3,482,847 A | 12/1969 | Hart |
| 3,493,085 A | 2/1970 | Libart |
| 3,592,443 A | 7/1971 | Budrow et al. |
| 3,595,527 A | 7/1971 | Douglass |
| 3,614,064 A | 10/1971 | Bennett |
| 3,636,586 A | 1/1972 | Bollinger et al. |
| 3,643,975 A | 2/1972 | Parkhurst |
| 3,741,586 A | 6/1973 | Wiczer |
| 3,744,757 A | 7/1973 | White et al. |
| 3,750,593 A | 8/1973 | Zetterfund |
| 3,751,758 A | 8/1973 | Higbee et al. |
| 3,772,733 A | 11/1973 | Stosberg et al. |
| 3,779,579 A | 12/1973 | Ostwald |
| 3,781,035 A | 12/1973 | Petersson et al. |
| 3,801,068 A | 4/1974 | Kopas |
| 3,817,493 A | 6/1974 | Hanser |
| 3,841,663 A | 10/1974 | Proffit |
| 3,854,750 A | 12/1974 | Voehringer, Jr. |
| 3,860,216 A | 1/1975 | Brown |
| 3,863,894 A | 2/1975 | Mansi et al. |
| 3,881,691 A | 5/1975 | Colclasure |
| 3,902,576 A | 9/1975 | Pitan et al. |
| 3,904,224 A | 9/1975 | Belke |
| 3,934,852 A | 1/1976 | Weber et al. |
| 3,942,608 A | 3/1976 | Frank et al. |
| 3,944,259 A | 3/1976 | Miller |
| 3,949,444 A | 4/1976 | Mattinson |
| 3,951,383 A | 4/1976 | Tenney, Jr. |
| 3,957,249 A | 5/1976 | Williams |
| 3,984,082 A | 10/1976 | Boettcher |
| 4,028,773 A | 6/1977 | Morgan |
| 4,037,291 A | 7/1977 | Huempfner et al. |
| 4,067,543 A | 1/1978 | Orth et al. |
| 4,077,086 A | 3/1978 | Butler |
| 4,110,866 A | 9/1978 | Ishii |
| 4,150,840 A | 4/1979 | Banerjea et al. |
| 4,176,825 A | 12/1979 | Schwebke |
| 4,212,093 A | 7/1980 | Lombard |
| 4,235,542 A | 11/1980 | Paterik, Jr. |
| 4,246,677 A | 1/1981 | Downing et al. |
| 4,249,282 A | 2/1981 | Little |
| 4,250,593 A | 2/1981 | Sachser |
| 4,269,424 A | 5/1981 | Gray |
| 4,280,246 A | 7/1981 | Christensen |
| 4,303,254 A | 12/1981 | Swanson et al. |
| 4,316,601 A | 2/1982 | Osborne et al. |
| 4,349,937 A | 9/1982 | Fontana |
| 4,399,587 A | 8/1983 | Penifaure |
| 4,414,702 A | 11/1983 | Neumann |
| 4,417,738 A | 11/1983 | Kendall |
| 4,471,508 A | 9/1984 | Seaborg |
| 4,494,272 A | 1/1985 | Morita |
| 4,580,804 A | 4/1986 | Weber |
| 4,591,175 A | 5/1986 | Upton |
| 4,615,534 A | 10/1986 | Blain |
| 4,623,125 A | 11/1986 | Ebey |
| 4,629,036 A | 12/1986 | Choy |
| 4,635,904 A | 1/1987 | Whittingham |
| 4,653,764 A | 3/1987 | McNeill |
| 4,662,610 A | 5/1987 | Cofer |
| 4,669,146 A | 6/1987 | Saito et al. |
| 4,711,428 A | 12/1987 | Carpenter |
| 4,747,180 A | 5/1988 | Screen |
| 4,779,889 A | 10/1988 | Morrison |
| 4,796,864 A | 1/1989 | Wilson |
| 4,815,711 A | 3/1989 | Bruno et al. |
| 4,835,815 A | 6/1989 | Mellwig et al. |
| 4,845,804 A | 7/1989 | Garrett |
| 4,865,295 A | 9/1989 | Holloway |
| 4,918,783 A | 4/1990 | Chu |
| D310,799 S | 9/1990 | Merwe et al. |
| 5,013,011 A | 5/1991 | Halloway |
| 5,040,265 A | 8/1991 | France et al. |
| 5,087,063 A | 2/1992 | Merrill, Jr. |
| 5,199,534 A | 4/1993 | Goff |
| 5,383,536 A | 1/1995 | Butter et al. |
| 5,394,962 A | 3/1995 | Gray |
| 5,451,080 A | 9/1995 | Kneile |
| 5,461,753 A | 10/1995 | Rounds |
| 5,465,986 A | 11/1995 | MacRae |
| 5,467,838 A | 11/1995 | Wu |
| 5,470,167 A | 11/1995 | Benckert et al. |
| 5,517,718 A | 5/1996 | Eichhorn |
| 5,566,788 A | 10/1996 | Smith et al. |
| 5,664,645 A | 9/1997 | Rodriguez |
| 5,745,951 A | 5/1998 | Waner |
| 5,774,936 A | 7/1998 | Vetter |
| 5,785,154 A | 7/1998 | Chen |
| 5,899,469 A | 5/1999 | Pinto et al. |
| 5,967,535 A | 10/1999 | King |
| 5,984,353 A | 11/1999 | Rasmussen |
| 6,134,748 A | 10/2000 | Kuo |

(56) References Cited

U.S. PATENT DOCUMENTS

| | | |
|---|---|---|
| 6,212,733 B1 | 4/2001 | Yeh |
| 6,267,357 B1 | 7/2001 | Ebey et al. |
| 6,286,184 B1 | 9/2001 | Dean et al. |
| 6,293,369 B1 | 9/2001 | Bueneman |
| 6,302,381 B1 | 10/2001 | Roll |
| 6,311,954 B1 | 11/2001 | Breslin et al. |
| 6,360,851 B1 | 3/2002 | Yang |
| 6,511,279 B1 | 1/2003 | Harkcom et al. |
| 6,619,671 B1 | 9/2003 | Fine |
| 6,725,501 B2 | 4/2004 | Harris et al. |
| 6,726,236 B2 | 4/2004 | Cofer |
| 6,739,601 B1 | 5/2004 | Fine |
| 6,810,561 B1 | 11/2004 | Liu |
| 6,834,746 B1 | 12/2004 | Lin |
| 6,874,764 B2 | 4/2005 | Drake, III |
| 6,880,202 B2 | 4/2005 | Thompson et al. |
| 6,945,343 B1 | 9/2005 | Moreau et al. |
| 7,182,178 B2 | 2/2007 | Chung |
| 7,192,011 B2 | 3/2007 | Meissner |
| 7,210,690 B2 | 5/2007 | Tan |
| 7,219,914 B2 | 5/2007 | Huddleston |
| 7,284,299 B2 | 10/2007 | Ruckman et al. |
| 7,383,611 B2 | 6/2008 | Foster |
| 7,396,034 B2 | 7/2008 | Wilson, Jr. |
| 7,425,012 B1 * | 9/2008 | Sease .......................... 280/475 |
| 7,494,154 B2 | 2/2009 | Richards et al. |
| 7,506,404 B2 | 3/2009 | Block et al. |
| 7,611,160 B1 | 11/2009 | Ignacio |
| 7,698,780 B2 | 4/2010 | Yan |
| 7,954,829 B2 | 6/2011 | Von Tersch |
| 8,029,020 B2 | 10/2011 | Henson et al. |
| 8,091,922 B2 | 1/2012 | McMahan |
| 8,167,095 B2 | 5/2012 | Sonnendorfer et al. |
| 8,181,983 B2 | 5/2012 | Walstrom et al. |
| 8,220,833 B2 | 7/2012 | Van Der Plaats et al. |
| 8,246,011 B1 | 8/2012 | Fox, III |
| 8,292,327 B2 | 10/2012 | Araya Moreno et al. |
| 8,365,353 B2 | 2/2013 | Block et al. |
| 8,365,354 B1 | 2/2013 | Fan |
| 8,393,053 B2 | 3/2013 | Melara |
| 8,407,856 B2 | 4/2013 | Frame |
| 8,418,315 B1 | 4/2013 | Lin et al. |
| 8,424,158 B2 | 4/2013 | Steenson |
| 8,783,716 B1 | 7/2014 | Pequignot |
| 2001/0029643 A1 | 10/2001 | Schroeder et al. |
| 2003/0017038 A1 | 1/2003 | Harkcom et al. |
| 2004/0159826 A1 | 8/2004 | Peschmann et al. |
| 2006/0214147 A1 | 9/2006 | Meissner |
| 2007/0040369 A1 | 2/2007 | Lotman |
| 2007/0228348 A1 | 10/2007 | Rabska |
| 2008/0143498 A1 | 6/2008 | Sonnendorfer et al. |
| 2008/0153678 A1 * | 6/2008 | McClusky .................... 482/106 |
| 2009/0159863 A1 | 6/2009 | Scott et al. |
| 2009/0211054 A1 | 8/2009 | Frame |
| 2009/0236577 A1 | 9/2009 | Pollock et al. |
| 2009/0272952 A1 | 11/2009 | Manuel Alguera |
| 2010/0117038 A1 | 5/2010 | Pinnell, III et al. |
| 2010/0213427 A1 | 8/2010 | Trowbridge et al. |
| 2011/0113593 A1 | 5/2011 | Bebbington |
| 2011/0187080 A1 | 8/2011 | Wallace |
| 2011/0215286 A1 | 9/2011 | Harper |
| 2012/0255141 A1 | 10/2012 | Lin et al. |
| 2013/0187527 A1 * | 7/2013 | Graham et al. ............... 312/401 |

FOREIGN PATENT DOCUMENTS

| | | |
|---|---|---|
| CH | 607958 | 12/1978 |
| EP | 0163621 | 12/1985 |
| EP | 0354827 | 2/1990 |
| EP | 0891889 | 1/1999 |
| EP | 2042395 | 4/2009 |
| GB | 924592 | 4/1963 |
| GB | 2279242 | 1/1995 |
| GB | 2297247 | 7/1996 |
| GB | 2348289 | 9/2000 |
| GB | 2384175 | 7/2003 |
| JP | H05254306 | 10/1993 |
| JP | H10264603 | 10/1998 |
| WO | 94/23960 | 10/1994 |
| WO | 9508449 | 3/1995 |
| WO | 9967122 | 12/1999 |
| WO | 03055705 | 7/2003 |
| WO | 2015100204 | 7/2015 |

OTHER PUBLICATIONS

Fastway Installation and Operation Instructions, Model 88-00-6500, 2009.

Fastway Installation and Operation Instructions, Flip Automatic Jack Foot for 2¼ jacks, Model 88-00-6500, 2009.

Caster Nomenclature, Drawing by Institute of Caster Manufacturers, printed on Jul. 28, 2013.

Medium Duty Caster Anatomy, www.albioncasters.com, printed Jul. 28, 2013.

Heavy Duty Caster Anatomy, www,albioncasters.com, printed Jul. 28, 2013.

Brute Super Foot, www.huskytow.com/product/brute-super-foot/ printed Jan. 8, 2014.

Written International Search Report mailed Mar. 18, 2015 for PCT/US14/071811 filed Dec. 22, 2014.

Written Opinion mailed Mar. 18, 2015 for PCT/US14/071811 filed Dec. 22, 2014.

* cited by examiner

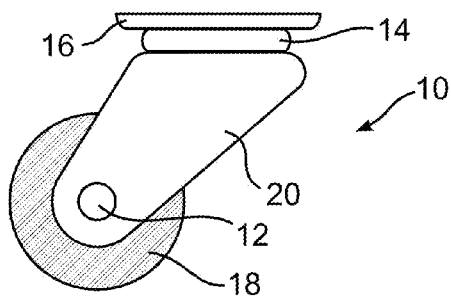
FIG. 1 - PRIOR ART
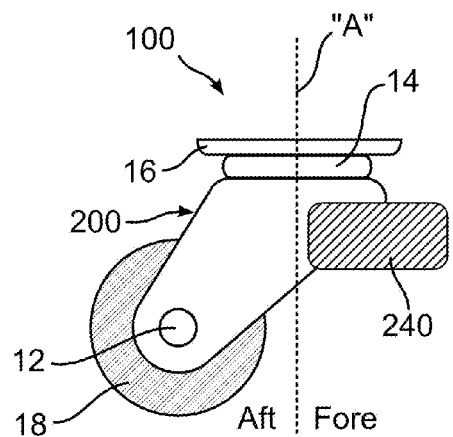
FIG. 2
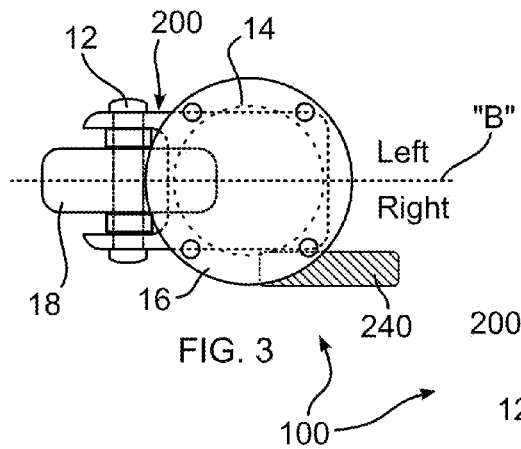
FIG. 3
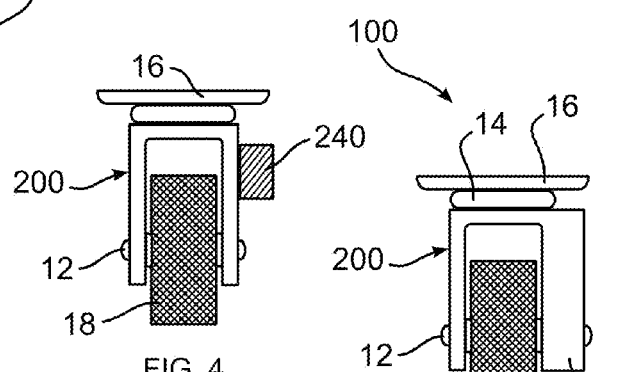
FIG. 4
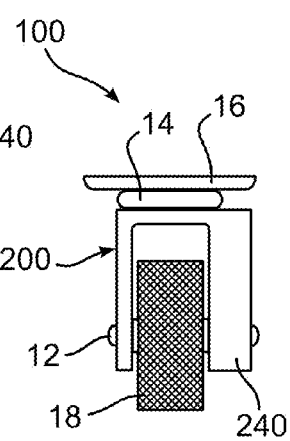
FIG. 5
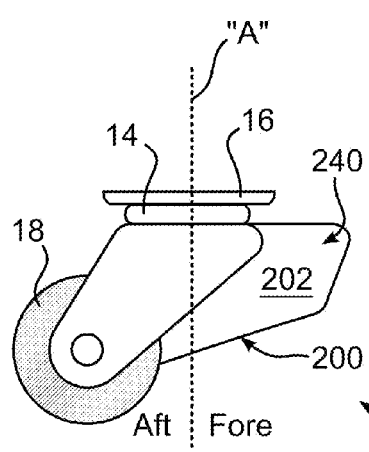
FIG. 6
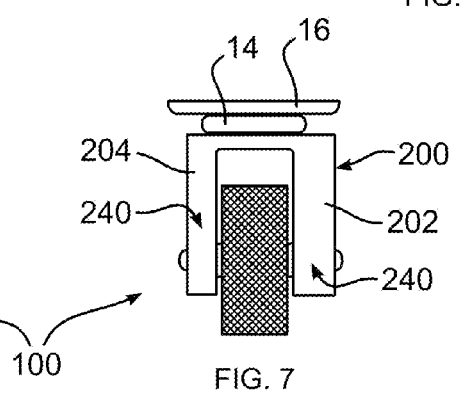
FIG. 7

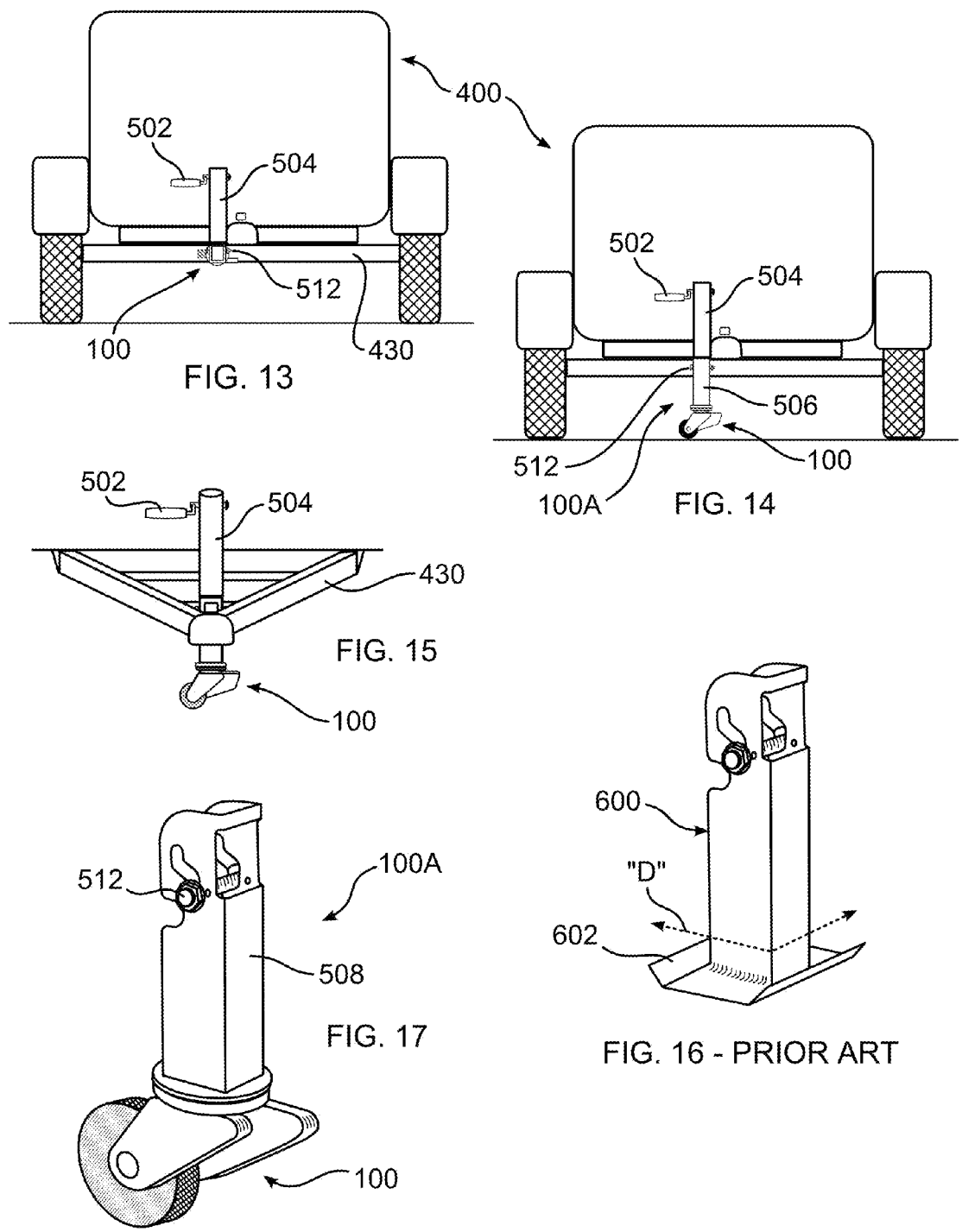

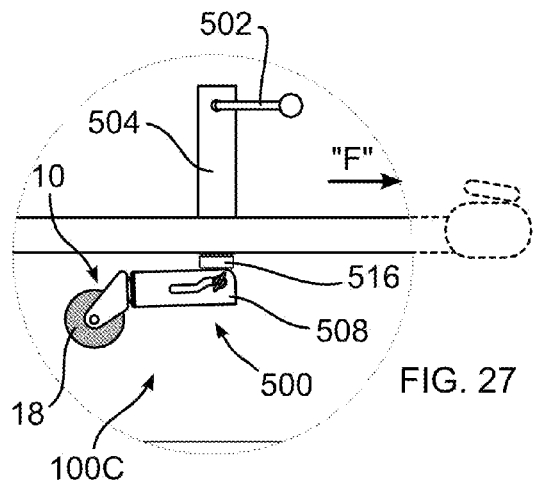
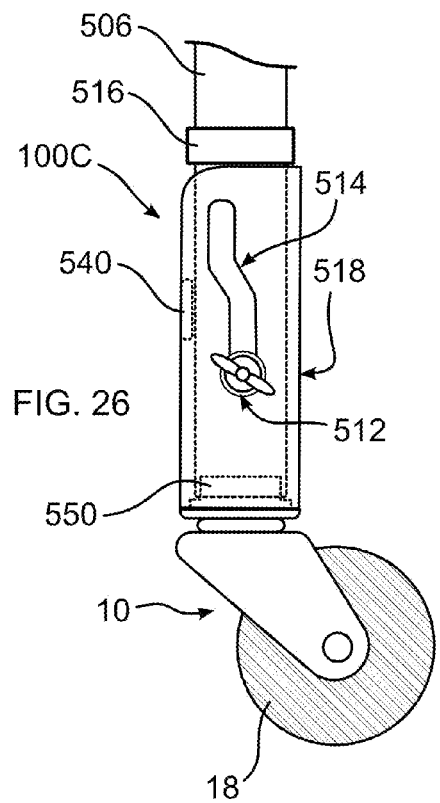
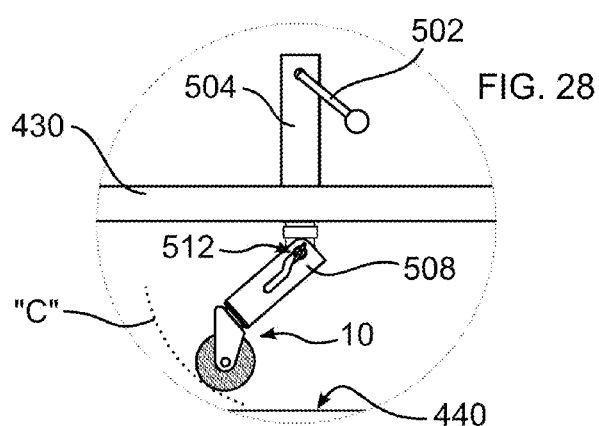
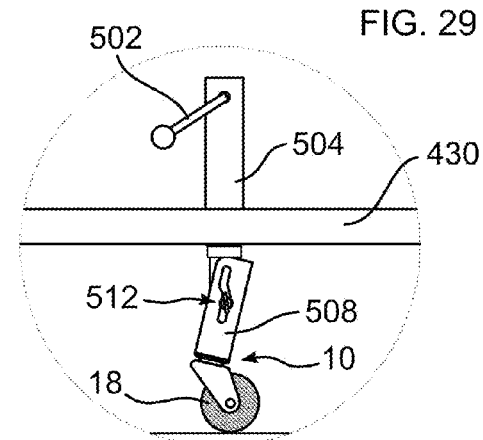
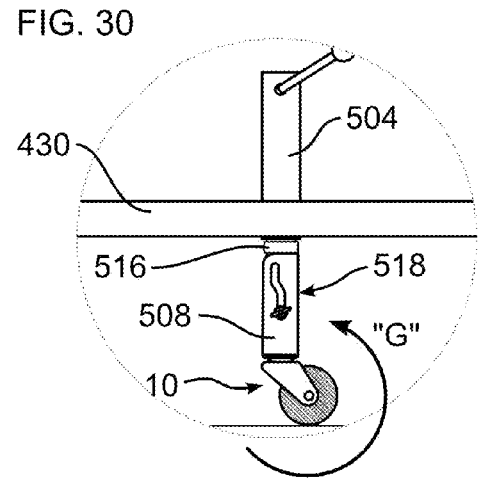
FIG. 27
FIG. 26
FIG. 28
FIG. 29
FIG. 30

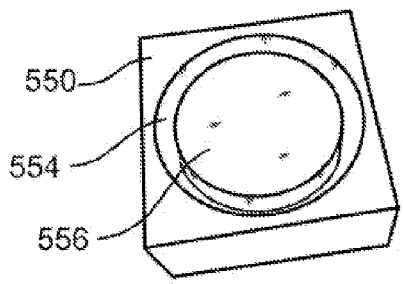
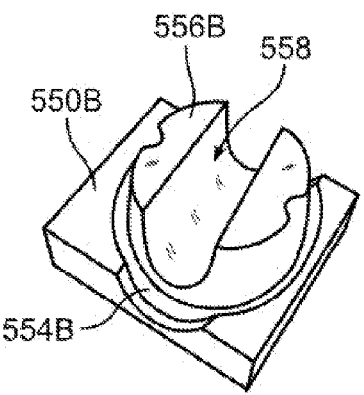
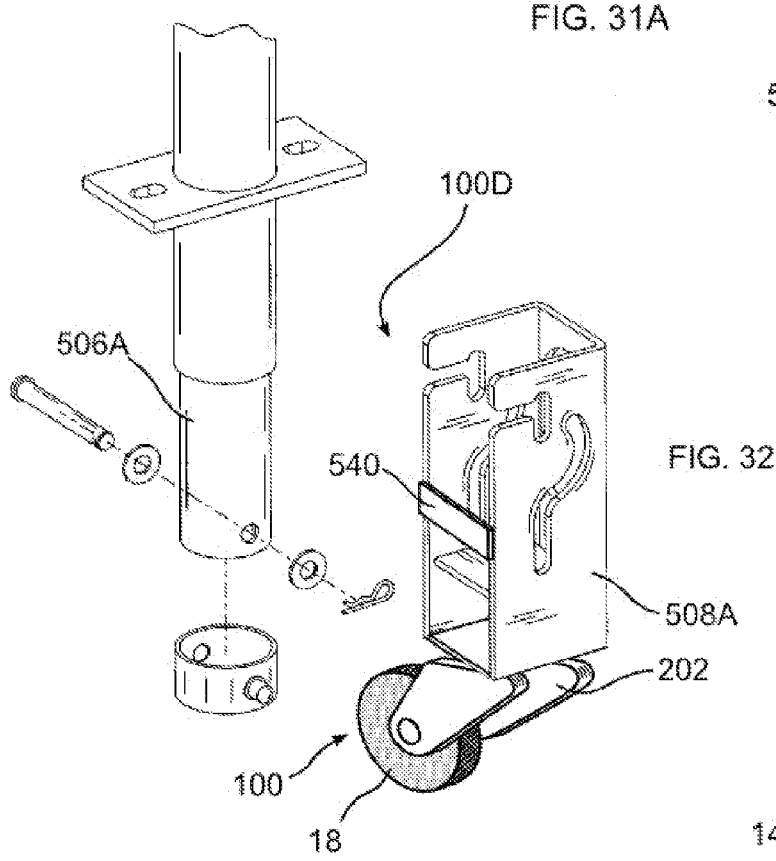
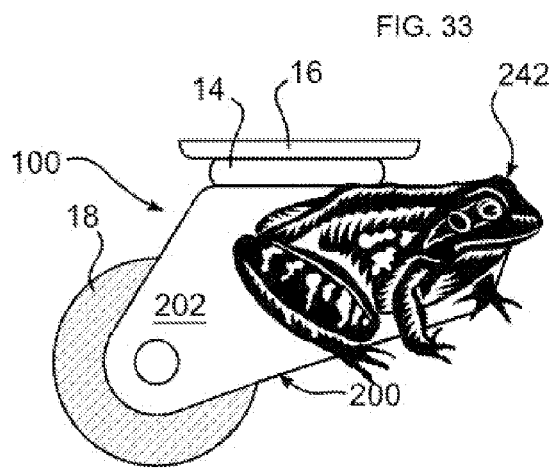

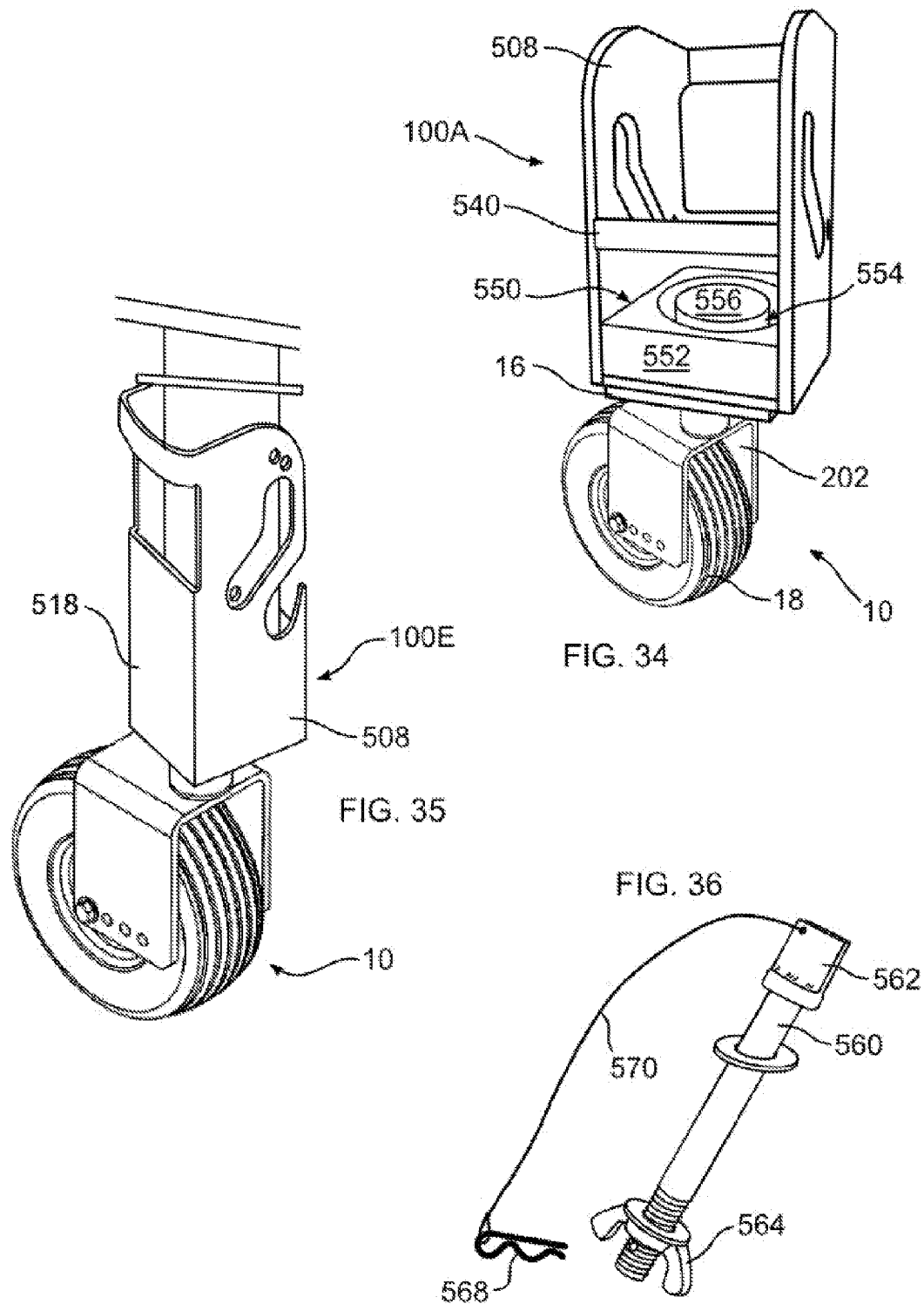

GRAVITATIONALLY ALIGNING WHEELS

CROSS REFERENCE TO RELATED APPLICATIONS

This application is a continuation-in-part of U.S. patent application Ser. No. 14/139,288, filed Dec. 23, 2013, the contents of which are incorporated herein by reference in their entirety.

FIELD OF THE INVENTION

The invention relates to a system and method for aligning wheels, and more particularly, to aligning caster wheels using gravitational forces.

BACKGROUND OF THE INVENTION

With reference to FIG. 1, a prior art swiveling caster 10 is illustrated, including a wheel 18, bearing 12, frame or fork 20, pivot 14, and mounting base 16. Such pivoting prior art casters include an offset axle so that the caster can pivot to align an orientation of the wheel with a direction of desired movement. This is accomplished by applying a directional force to the mounting base via a force exerted upon base 16 through connection with a supported article, such as a chair, or cart, for example.

Casters can include a single wheel 18 and fork 20, as illustrated, or can include a plurality of wheels 18 supported by one or more forks 20 connected to a common pivot. An article may be supported by any number of casters 10, and may be used in combination with non-pivoting casters (not shown). Casters 10 can include a wheel brake which can be deployed to restrict rotation of wheel 18 about bearing 12. A pivot lock can be provided which, when deployed, further restricts rotation of fork 20 about an axis of pivot 14. A wheel brake or pivot lock is typically deployed by moving a lever or other actuator.

SUMMARY OF THE INVENTION

In accordance with an embodiment of the disclosure, a wheel assembly for movingly supporting an object comprises a bearing; a wheel rotatable in connection with the bearing to be rotatable in a first direction, but not rotatable in a second direction, transverse to the first direction; a pivot connectable to the object; and a frame connected to the pivot to thereby be pivotable with respect to the object, the frame sized and dimensioned to support the bearing at an offset with respect to the pivot axis of the pivot to thereby form caster trail, the frame having a mass distributed non-symmetrically with respect to a plane radially bisecting the wheel, to thereby causing the frame to pivot with respect to the Earth, to a predetermined orientation, when the frame is tilted with respect to a normal orientation with respect to the Earth.

In various embodiments thereof, the frame is cast to distribute the mass; the mass of the frame includes a weight connected to the frame; the weight is releasably connectable to the frame; a position of the weight is adjustable with respect to the frame; the predetermined orientation orients the wheel to be rotatable about an axis that is parallel to a forward or reverse direction of travel of the object; the frame comprises a fork having a plurality of legs, and wherein a weight of a fork leg is different relative to another fork leg; and/or the bearing is an axle.

In an alternative embodiment of the disclosure, a method for movingly supporting an object comprises connecting a wheel assembly to an object to be moved, the wheel assembly including—a bearing; a wheel rotatable in connection with the bearing to be rotatable in a first direction, but not rotatable in a second direction, transverse to the first direction; a pivot connectable to the object; and a frame connected to the pivot to thereby be pivotable with respect to the object, the frame sized and dimensioned to support the bearing at an offset with respect to the pivot axis of the pivot to thereby form caster trail, the frame having a mass distributed unequally upon left and right sides of the wheel assembly, thereby causing the frame to pivot with respect to the Earth, to a predetermined orientation, when the frame is tilted with respect to a normal orientation with respect to the Earth.

In various embodiments thereof, the frame is cast to distribute the mass; the mass of the frame includes a weight connected to the frame; the weight of the portion of the wheel assembly forward of a pivot axis of the pivot is equal to a weight of the portion of the wheel assembly aft of the pivot axis, thereby balancing the wheel assembly fore and aft.

In yet further embodiments thereof, the method further includes adjusting a position of the weight with respect to the frame to attain the desired predetermined orientation with the frame is tilted; and/or adjusting a position of the weight includes attaining a predetermined orientation which orients the wheel to be rotatable about an axis that is parallel to a normal forward or reverse direction of travel of the object.

In a yet further embodiment of the disclosure, a trailer stand comprises a wheel assembly including—a bearing; a wheel rotatable in connection with the bearing to be rotatable in a first direction, but not rotatable in a second direction, transverse to the first direction; a pivot connectable to the object; and a frame connected to the pivot to thereby be pivotable with respect to the object, the frame sized and dimensioned to support the bearing at an offset with respect to the pivot axis of the pivot to thereby form caster trail, the frame having a mass distributed unequally upon left and right sides of the wheel assembly, thereby causing the frame to pivot with respect to the Earth, to a predetermined orientation, when the frame is tilted with respect to a normal orientation with respect to the Earth; and a carriage connectable to the trailer, the carriage pivotable along a plane from a stowed position in which the carriage is disposed at an angle with respect to a normal orientation with respect to the Earth, and a deployed position where the carriage is aligned normal to the Earth, a portion of the wheel assembly pivot connectable to a distal end of the carriage to enable the frame to rotate with respect to the carriage, the predetermined orientation being transverse to the plane when the carriage is moved from the stowed position to the deployed position, the frame rotatable to the predetermined position due to the force of gravity acting upon the distributed mass.

In various embodiments thereof, the trailer stand further includes a crank assembly affixed to the trailer and configured to rotate the carriage with respect to the trailer; and/or the trailer stand further includes a jack assembly connected to the trailer and having a driving assembly and a piston, the piston pivotally connected to the carriage to connect the carriage to the trailer.

In other embodiments thereof, the pivotal connection between the carriage and the piston includes a pivot pin, the carriage including a non-linear slot in which the pivot pin moves to thereby cause a change in angular orientation of the carriage as the piston is driven; the pivotal connection of the piston and carriage define a plane, the predetermined position defining a rotational axis of the wheel transverse to the plane;

and/or the wheel assembly is connected to the distal end of the carriage by at least one of a bolted connection and welded connection.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 depicts a PRIOR ART caster;

FIG. 2 depicts a caster of the disclosure, with an attached biasing weight;

FIG. 3 depicts the caster of FIG. 2, viewed from above;

FIG. 4 depicts the caster of FIG. 2, viewed from the rear;

FIG. 5 depicts an alternative embodiment of a caster of the disclosure, having a biasing weight integrated into the fork frame;

FIG. 6 depicts the caster of FIG. 5, viewed from a side;

FIG. 7 depicts an alternative embodiment of a caster of the disclosure, having an alternative weight or mass distribution;

FIG. 13 depicts is a front view of the trailer of FIG. 8, the caster and jack in a stowed position;

FIG. 14 depicts is a front view of the trailer of FIG. 8, the caster and jack in a deployed position;

FIG. 15 depicts an orientation of caster and jack in a central disposition within a trailer;

FIG. 16 depicts a tilting jack base stand of the PRIOR ART; and

FIG. 17 depicts a tilting jack stand and caster of the disclosure.

FIG. 26 depicts a caster wheel combined in accordance with the disclosure, to a jack of the prior art;

FIG. 27-30 depict sequential stages of deployment of the combination of FIG. 26;

FIG. 31A depicts a ram brace configuration of the disclosure;

FIG. 31B depicts an alternative ram brace configuration of the disclosure;

FIG. 32 depicts a caster wheel, combined in accordance with the disclosure, to an alternative jack of the prior art;

FIG. 33 depicts an ornament or ornamental weight connected to a caster of the disclosure;

FIG. 34 depicts the ram brace of FIG. 31 deployed within a jack and caster assembly of the disclosure;

FIG. 35 depicts a caster wheel, combined in accordance with the disclosure, to an alternative jack of the prior art; and FIG. 36 depicts a quick release pivot bolt of the disclosure.

DETAILED DESCRIPTION OF THE INVENTION

Figure 8:
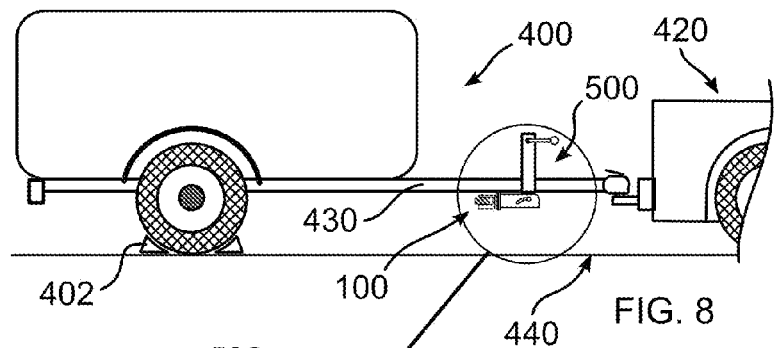
FIG. 8 depicts the caster of FIG. 5, configured together with a trailer jack, operatively positioned upon a trailer, the trailer hitched to a towing vehicle.
Figure 9:
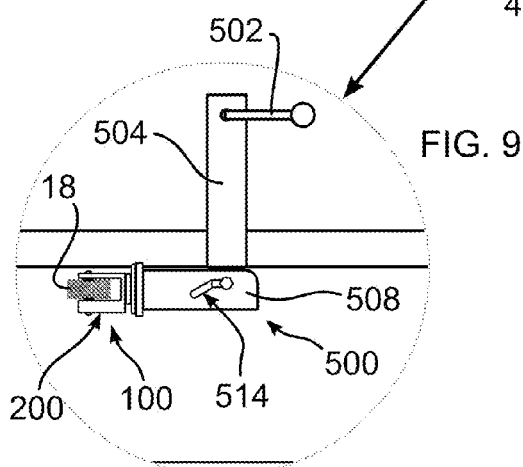
FIG. 9 depicts an enlarged view of the encircled portion of FIG. 8.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two, or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

With reference to FIG. 2, a caster 100 of the disclosure includes a wheel 18, a fork or bearing mounting frame 200, an axle or bearing 12, pivot 14, and mounting base 16. While a single wheel caster is illustrated, it should be understood that frame 200 can be adapted to double or compound caster wheels. Forks or frames 200 for other of the various caster wheel designs known can be modified in accordance with the disclosure in a like manner as described with respect to frame 200, as would be understood by one skilled in the art. Further, frame 200 can be designed with greater or lesser trail, or offset between an axis of bearing 12, and a parallel axis passing through a center of pivot 14, as determined by the requirements of a particular caster application. While an bearing 12 is illustrated, it should be understood that bearings of any type can be used with a caster 100 of the disclosure, including a roller bearing, for example. Further, while mounting base 16 is illustrated to be plate-like, other types of mountings known in the art, or hereinafter developed, can be used.

As may be seen in FIGS. 2-3, an embodiment of the disclosure includes a weight 240 connected or connectable to frame 200, to thereby be pivotable together with frame 200, bearing 12, and wheel 18. Weight 240 is positioned to counterbalance, at least in part, a weight of portions of the caster which are greater on one side of a pivot axis "A", due to the offset nature of bearing 12. This would typically include some or all of the weight of wheel 18 and bearing 12, and more than half of the weight of fork 20 of the prior art. Thus, weight is balanced fore and aft, as defined by a direction of travel of caster 100, with respect to axis "A". Although a balanced fore/aft distribution is described here, a different distribution may be desired, as detailed elsewhere herein. Accordingly, frame 200 can be configured to provide a different fore/aft distribution of weight. One such embodiment is illustrated in FIGS. 2-3. It should be understood that weight 240 includes any object or material having mass which is affected by the force of gravity.

In an embodiment of the disclosure, weight 240 is releasably connectable to frame 200 using any known means, including for example magnetic attraction, hook and loop fasteners, adhesive, straps, screws, bands, hooks, clips, or snaps. In a further embodiment, a location of weight 240 may be changed to alter a predetermined orientation of frame 200 with respect to the Earth, due to gravity.

While a weighted frame 200 is shown and described, it should be understood that weight 240 could be applied or connected, at least in part, to the portion of pivot 14 connected to frame 200, and/or to any other pivoting portion of the caster, including wheel 18 and bearing 12.

In an embodiment, weight 240 can be configured to have an equal weight (or mass) of the difference between the portions of the wheel 18, bearing 12, and frame 200 (exclusive of the additional weight 240) to an opposite side of pivot axis "A", and the portions of the wheel 18, bearing 12, and frame 200 (exclusive of the additional weight 240) on a same side of axis "A". In this configuration, the portions of the caster 100 connected below pivot 14 are balanced fore and aft of the pivot axis, with respect to a direction of travel of the caster, for example a normal forward and reverse direction of travel of the object supported by the caster.

In FIG. 3, it can be seen that weight 240 is biased or positioned to the left of an axis "B" indicating left and right portions of caster 100, with respect to a direction of travel of caster 100. Accordingly, a weight bias is established by weight 240, whereby when caster 100 is oriented at an angle different from an upright, in-use position, for example in a stowage position, caster 100 will orient by rotating about pivot 14, to a particular orientation with respect to Earth, due to gravitational forces acting upon the particular distribution of weight of caster 100. A weight distribution can be accomplished by selecting a position of weight 240 both fore and aft, and left and right.

While FIGS. 2-4 illustrate a particular embodiment using a single discrete weight 240 affixed to frame 200, a like result, and more particularly the establishment of a particular center of gravity of the pivotable portions of caster 100, can be accomplished by distributing weight 240 within and about the pivotable components. Thus, with reference to FIGS. 5-7, it may be seen that a portion of frame 200 can be widened distributing weight 240 within the material of frame 200. In FIG. 5, it may be seen that by increasing a thickness of a single frame leg 202, a weight distribution left to right may be accomplished. In an embodiment, frame 200 comprises only a single leg. While a thickening of portions of frame 200, or externally mounted weights, is shown in the drawings for ease of understanding, it should be understood that frame 200 can be configured to be thickened in non-visible areas, and/or may be fabricated with materials of varying weight, so that there is no visible indication of added weight or a thickening of various portions of frame 200, bearing 12, or any other part of caster 100.

In FIG. 6, it may be seen that by also, or alternatively, lengthening single frame leg 202 in a direction away from axis "A", not only does the weight of leg 202 increase, but weight may be distributed fore and aft, as well. In FIG. 7, it can be seen that each leg 202, 204 can be thickened, but by varying or like amounts. Additionally, both frame legs 202, 204 can be lengthened, as shown for leg 202 in FIG. 6, but each to a lesser extent than might be required if only a single leg 202 was lengthened. Adjustments in a distribution of weight 240, or to a width of wheel 18, for example, can be made to avoid flutter at the various speeds at which caster 100 is expected to operate, using calculations and/or experimental observations.

Caster 100 can be used to convey a wide variety of vehicles or objects or articles, including for example a wheeled ambulance or hospital cot; shopping cart; suitcase or luggage, trolley; stroller; transport carts; furniture; baby carriage; trailer wheel stand; tool cart; food cart; airline food/beverage service cart; or any other application which benefits from a caster wheel. In each application, it may be advantageous for a caster tilted away from a ground contacting position to assume a particular orientation with respect to Earth, prior to the caster regaining contact with a travel surface. For example, a cart that has tipped or tilted to an unstable position can be slowed or stopped using a caster 100 of the disclosure. Further, caster 100 can be used with automated equipment that must nest or stack carts, and which require a particular orientation of casters to speed or enable proper alignment of carts as they are stacked.

More particularly, as the wheeled object is tilted, caster 100 is lifted and tilted with respect to the Earth. Due to a predetermined weight distribution of caster 100 with respect to the cart and the Earth, caster 100 can be caused to pivot wheel 18 to a non-rotating orientation with respect to a direction of travel of the object. Specifically, frame 200 can be turned using gravity and the weight distribution of frame 200 in accordance with the disclosure, so that a rotational axis of wheel 18 is perpendicular to a current direction of travel. Accordingly, when caster 100 regains contact with the travel surface, wheel 18 resists rotation until caster 100 pivots to orient wheel 18 to have an axis of rotation parallel with a direction of travel, thereby slowing the conveyed object and conferring stability.

An example of this can be found in FIGS. 8-14. In this embodiment, caster 100 is pivotally connected to a trailer jack 500, the jack affixed to a trailer 400 of any type. In FIG. 8, caster 100 is in a stowed or towing position, positioned a safe distance from the roadway as the trailer is pulled by vehicle 420. Caster 100 has been configured using weight 240, as described herein, to orient wheel 18 as illustrated, which is parallel to the Earth, enabling caster 100 to be stowed in a compact orientation, not projecting towards the travel surface.

Jack 500, together with combined embodiment 100A, described further with respect to FIGS. 13-17, includes a crank 502, cylinder 504, ram 506 (alternatively known as an inner tube or piston), carriage 508, bushing 510, pivot pin 512, and pivot channel 514. Caster 100 is welded, bolted, or otherwise affixed to an end of carriage 508. Carriage 508 is configured to pivot along a single deployment pivot plane, indicated by a plane passing through line "C" and pivot pin 512 in FIG. 10, with respect to cylinder 504 and ram 506. Caster 100 is weighted in accordance with the disclosure to maintain an orientation of wheel 18 to be perpendicular this single pivot plane. While ram 506 is illustrated to be cylindrical, it should be understood that ram 506 can have other profiles, including square or rectangular, for example. While a hand crank 502 is illustrated, it should be understood that ram 506 can be driven by any mechanical, hydraulic, electrical, or other advancing/retracting system known. Jack 500 may alternatively be referred to as a flip jack or jack foot.

Figure 10:
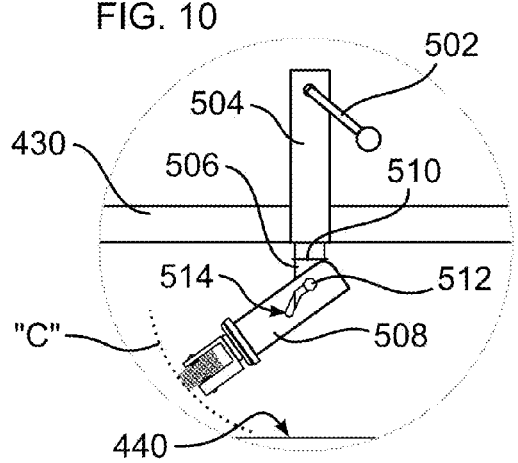
FIG. 10 depicts the caster and jack of FIG. 8, being deployed to a supporting position.
Figure 11:
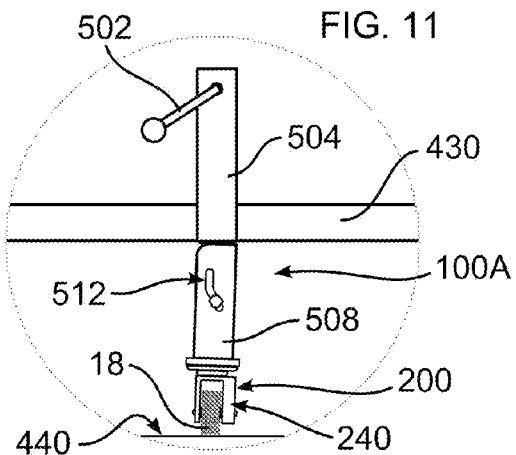
FIG. 11 depicts the caster and jack of FIG. 8, the wheel of the caster having touched the ground.

In FIG. 10, it may be seen that carriage 508 and connected caster 100 have begun to pivot about pivot pin 512 along the deployment plane, and accordingly carriage 508 and connected caster 100 are lowered towards travel surface 440. Carriage 508 can rotate as ram 506 lowers with respect to cylinder 504, the latter of which is affixed to trailer frame 430. As carriage 508 is lowered, pivot pin 512 is able to move along pivot channel 514, enabling movement and rotation of carriage 508 with respect to ram 506. Because of weight 240, as described herein, a rotational axis of wheel 18 is maintained perpendicular or transverse to a the pivot axis of carriage 508, as shown in FIGS. 8-12. In FIG. 11, wheel 18 makes contact with travel surface 440, but does not yet bear weight of trailer 400, and in FIG. 12, wheel 18 is pressed into travel surface 440, and bears weight of trailer tongue 400.

As weight is applied to wheel 18, beginning with an orientation shown in FIG. 11, there is a tendency for wheel 18 to rotate along travel surface 440 to a position of lower potential energy. However, such rotation would require carriage 508 to pivot in a direction transverse to the deployment plane, which is not possible. More particularly, carriage 508 encloses ram 506 on three sides, enabling movement of carriage 508 only along the deployment plane. This can be further understood in view of FIGS. 17-18, and with reference to U.S. Patent Publication 2011/0215286 A1, the contents of which are incorporated herein by reference.

Thus, wheel 18 is prevented from rotating through its connection to carriage 508. If wheel 18 were not maintained a predetermined orientation transverse to the deployment plane by weight 240, but instead oriented to align with the deployment plane, the forces of deployment would cause wheel 18 to rotate away from a deployment position, increasing the force required to deploy carriage 508, and reducing stability of the trailer during deployment. Conversely, by maintaining alignment of wheel 18 transverse to the deployment plane, a reduced force is required to crank carriage 508 into position, and stability of the trailer during deployment is maximized.

Wheel 18 maintains the desired transverse orientation during deployment because frame 200 can only pivot if caster 100 is moved with respect to travel surface 440. As wheel 18 is disposed transverse to the deployment plane, deployment does not tend to cause a movement of wheel 18 and thus there is no movement imparted to the trailer. Accordingly, a trailer at rest during deployment does not experience forces tending to produce movement of the trailer due to deployment, and therefore frames 200 are not rotated, and an orientation of wheel 18 is maintained. Notwithstanding the foregoing, other forces could cause movement of the trailer at a time of deployment, and it is therefore prudent to use one or more wheel chocks 402, as one would otherwise do when handling a trailer.

Figure 12:
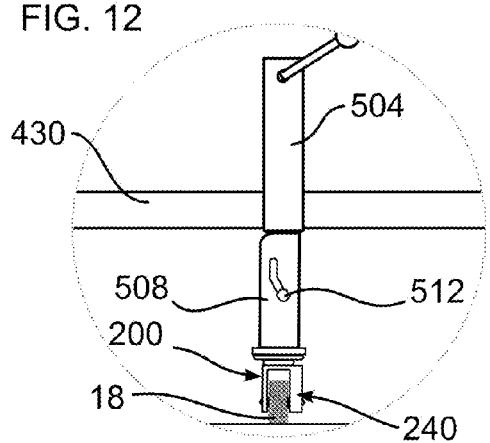
FIG. 12 depicts the caster and jack of FIG. 8, the caster and jack having been secured in a deployed position.

FIGS. 13-14 illustrate front views trailer 400, and of carriage 508 and caster 100 stowed as in FIG. 8, and deployed, as in FIG. 12, respectively. As can be seen in FIGS. 13-14, in this embodiment, jack 500 is mounted to a side of frame 430, resulting in jack 500 being offset from a centerline of trailer 400. While functional, particularly for lighter trailers, a centrally mounted jack 500 can be more stable. FIG. 15 illustrates a configuration in which jack 500 is centrally mounted, in this example to a cross-beam 432.

In FIG. 16, a prior art pivoting jack base stand 600 of the type described in U.S. Patent Publication 2011/0215286 is shown. In an embodiment 100A, shown in FIG. 17, a commercial example of such a jack can be configured with a caster 100 of the disclosure. Dotted line "D" indicates a location at which a base or base portion 602 can be cut away or otherwise removed. After removal of base portion 602, mounting base 16 of caster 100 can be connected to an end of carriage 508, for example by welding, bolting, threading, or any other sufficiently strong means. In this manner, a composite of jack 500 and caster 100, as illustrated in FIGS. 8-15 and 17 can be constructed. In another embodiment, base portion 602 can remain connected to carriage 508, and caster 100 can be fastened onto base portion 602 by any known means, including for example bolting.

Figure 18:
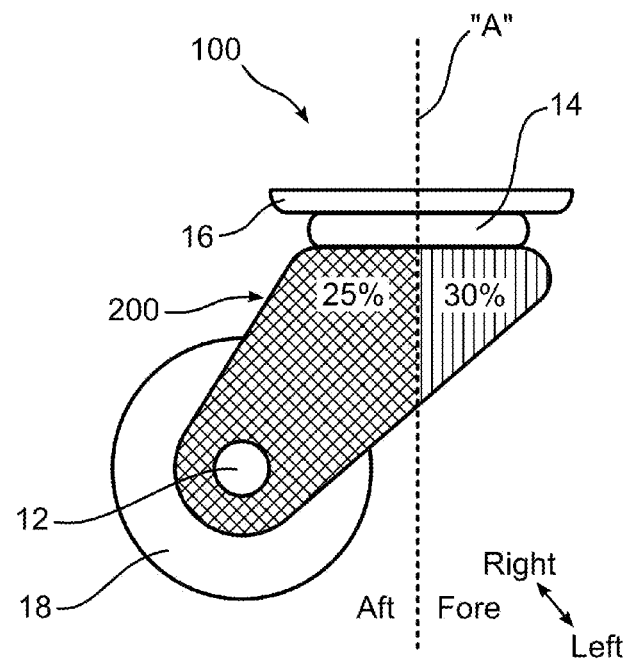
FIG. 18 depicts a left side view of a caster in accordance with the disclosure, illustrating an exemplary weight distribution in accordance with the disclosure.
Figure 19:
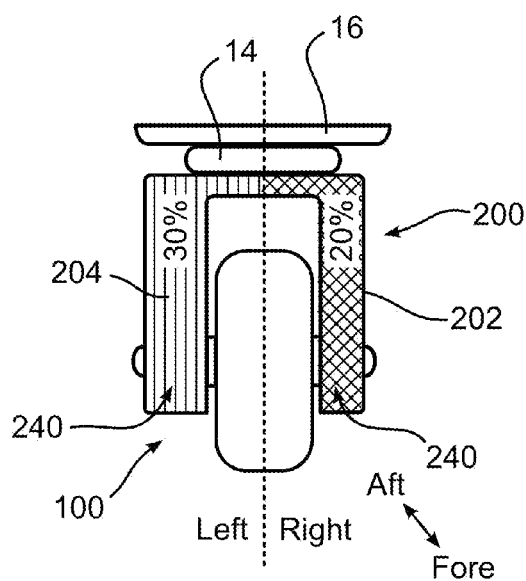
FIG. 19 depicts a forward view of the caster of FIG. 18.
Figure 20:
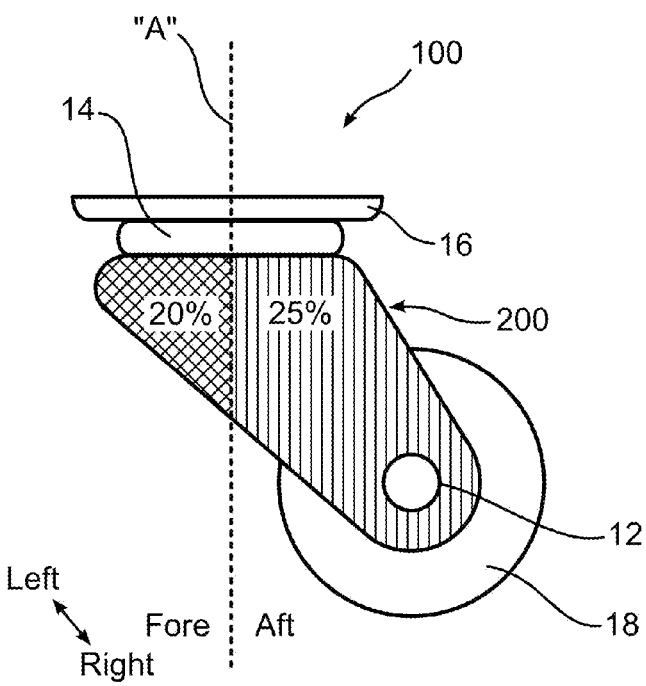
FIG. 20 depicts a right side view of the caster of FIG. 18.
Figure 21:
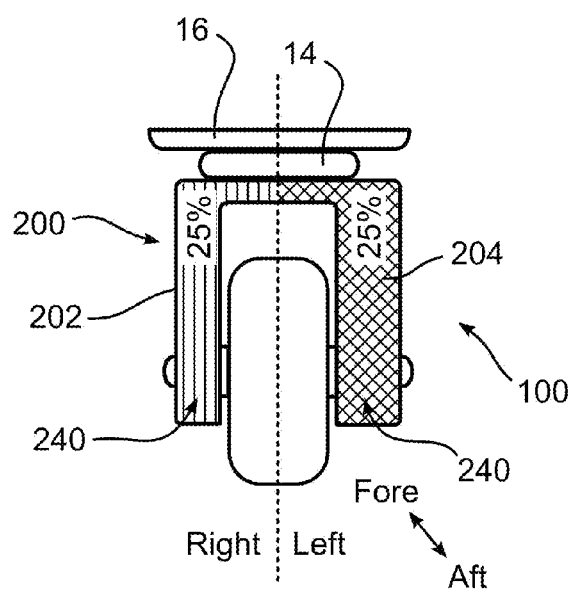
FIG. 21 depicts an aft view of the caster of FIG. 18.

With reference to FIGS. 18-21, an illustrative weight distribution is shown. In this embodiment, weight is distributed into four quadrants of caster 100 defined by a first plane passing through the pivot axis of pivot 14 and which radially bisects wheel 18, and a second plane which passes through the pivot axis of pivot 14 and is transverse to the first plane. As may be seen in FIG. 18, an Fore-Left portion has more weight than an Aft-Left portion. In FIG. 19, the caster of FIG. 18 is pivoted 90 degrees so that the caster is oriented with the Fore portion advancing towards the viewer. In this view, a Fore-Right portion has less weight than the Fore-Left portion. In FIG. 20, the caster of FIG. 19 has been pivoted 90 degrees again, so that the right side of the caster is visible. In this view, it may be seen that the Aft-Right portion has more weight than the Fore-Right portion. Finally, in FIG. 20, the caster has been rotated 90 degrees again, wherein the caster is oriented with the Fore portion moving away from the viewer. In this view, it may be seen that the Aft-Left portion has the same weight as the Aft-Right portion. Table 1 summarizes the weight distribution of this embodiment. The weight distribution reflects the weight of the corresponding quadrant, together with any additional weight added in accordance with the disclosure.

TABLE 1

| An Exemplary Weight Distribution (%) | | |
|---|---|---|
|  | Fore | Aft |
| Left | 30 | 25 |
| Right | 20 | 25 |

Thus, it may be seen that weight is distributed non-symmetrically. In particular, the left side of caster 100 in this embodiment has a greater weight than the right side, which tends to bring the left side closer to the Earth when the caster is tilted from vertical. Additionally, it may be seen that the fore and aft portions of the caster have a balanced weight. It should be understood, however, that the fore-aft weight distribution is balanced where a transverse orientation with respect to an orientation of forward travel is desired. Other weight distributions can be employed to produce other orientations. It should be further understood that other distributions may be used, for example a greater weight distribution on a given side, for example to overcome stiction within pivot 14. It should further be understood that the first and/or second planes are not required to pass through the pivot axis of pivot 14, or radially bisect wheel 18, in order to determine an allocation of weight, and that other logical constructs or theories can be employed to determine an allocation of weight, including empirical observation.

Figure 22:
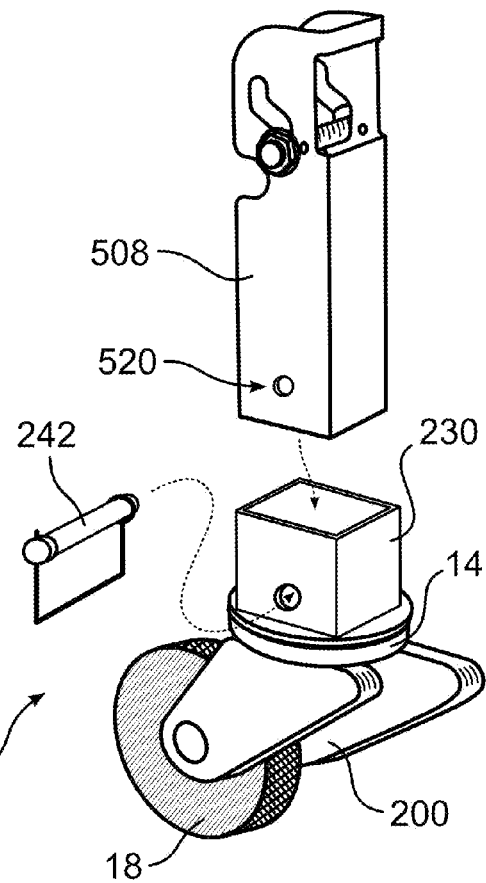
FIG. 22 depicts an exploded view of a combination caster and jack stand in accordance with the disclosure.
Figure 23:
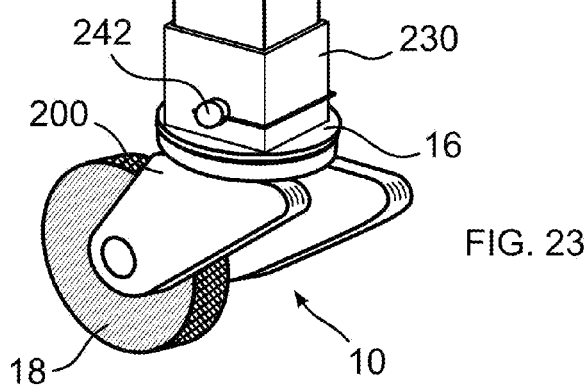
FIG. 23 depicts the connected portions of the caster and jack stand of FIG. 22.

Turning now to FIGS. 22-23, a prior art tilting jack base stand 600 has been prepared in the manner described with respect to FIG. 16, and has had aperture 520 formed in a lower portion, through opposing sides. A jack receiver 230 is affixed to base 16 or caster 14, and is sized and dimensioned to receive, or fit within, or otherwise mate with channel 508 of the prepared stand 600. In the embodiment shown, channel 508 and receiver 230 are mating rectangular shapes, however they can also be circular, for example, to form nesting tubes. When the prepared channel 508 and receiver 230 are mated, embodiment 100B is formed, as illustrated in FIG. 23. Receiver 230 includes receiver aperture 232 which is sized and dimensioned to align with stand aperture 520 when the respective parts are nested. A locking pin 242, or other fastener, such as a bolt and nut, can be provided, and passed through apertures 232, 520, to secure channel 508 to receiver 230, and thus to caster 100. While jack foot stand 600 of FIG.

16 is illustrated in this embodiment, it should be understood that receiver 230 can be connected directly to ram 506, eliminating jack stand 600, in this and other embodiments of the disclosure. Similarly, caster 100 can be connected to any other object or article in a manner as described in FIGS. 22-23.

Figure 24:
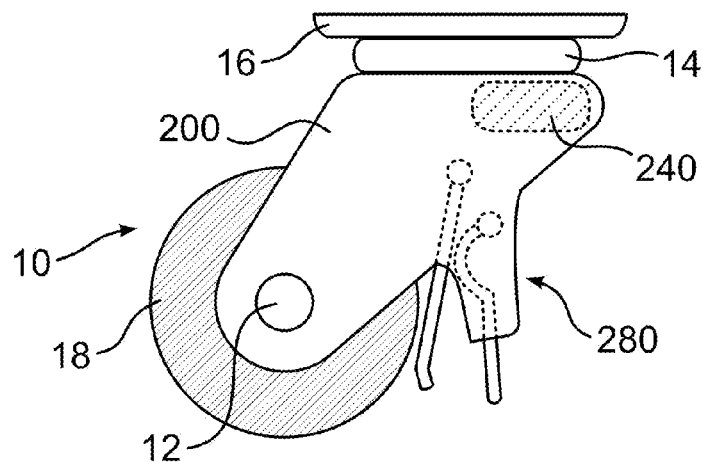
FIG. 24 depicts an alternative caster in accordance with the disclosure, including a weight distributing brake.

With reference to FIG. 24, a caster 100 includes an integrated braking mechanism 280 of any known or hereinafter design, the mass of braking mechanism is oriented as far in the forward direction, with respect to a direction of travel of caster 100, as is reasonably practicable, in order to thereby contribute to a counterbalancing of the offset weight of wheel 18 and associated supporting structures. In this manner, less additional non-functional counterbalancing mass is required in order to achieve a desired distribution of weight, as described herein, of caster 100.

Figure 25:
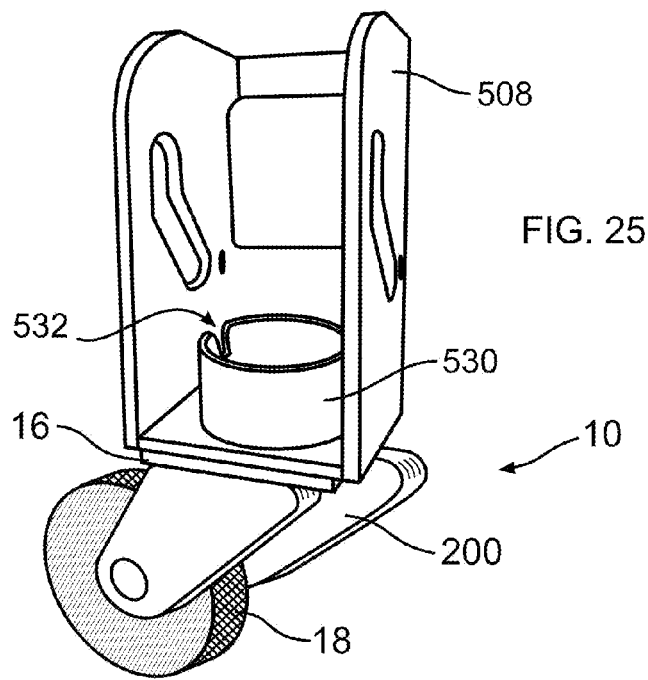
FIG. 25 depicts a caster and a jack foot of the disclosure, including a lower brace.

In FIG. 25, a brace 530 is affixed to a lower portion of carriage 508, and is sized and dimensioned to be positionable within a lower end of ram 506 as ram 506 completes a path within carriage 508. In this manner, ram 506 is further secured against movement when bearing weight of the trailer. In some configurations, ram 506 is fabricated to include a guide channel (not shown) formed to extend longitudinally along an exterior surface of ram 506, and thereby forming a longitudinal protrusion upon an inner surface of ram 506. Accordingly, a corresponding slot 532 is formed in brace 530, through which the piston protrusion can pass as the piston is slid over brace 530. In an alternative embodiment, brace 530 can be formed to surround ram 506, however, sufficient additional space must be available within carriage 508. An alternative brace is described elsewhere herein, with respect to FIGS. 26, 31, and 34.

In an embodiment, when caster 100 is supporting an object in movement, and caster 100 is tilted off a floor surface, caster 100 will swivel due to gravity to a predetermined transverse alignment that is perpendicular to the fore and aft moving direction of the wheeled object. Caster 100 can then substantially remain in this balanced position while it is approaching and almost contacting the floor surface. When contact between wheel 18 and the floor is restored, an instant braking action is achieved, due to the transverse alignment of wheel 18, where further forward motion of the object is impaired. This braking action can be overcome by applying an external pulling or pushing force to the object to cause the caster 100 to pivot to once again align wheel 18 with a direction of travel, after which caster 100 resumes normal operation.

A caster 100 in accordance with the disclosure is self-aligning to a predetermined alignment, and provides a braking action, without the addition of moving parts. Further, by riveting, molding, casting, stamping, or otherwise producing frame 200 with a desired distribution of weight 240, no additional parts are required relative to a conventional caster of the same style. The simple design of the disclosure is thus easy to assemble, can handle great weight and stress, and can be designed to look very similar or identical to a conventional caster. Further, casters 100 of the disclosure do not require any additional maintenance, and can be produced at the same or close to the same cost as prior art casters. Any number of casters 100 can be used to support an object, including casters disposed in a circular, star, or rectangular layout. Casters 100 can be deployed in a rearward location relative to a direction of travel, or in a central, and/or front most orientation.

Referring now to FIG. 26, a prior art standard caster 10 is coupled to jack base stand 600, to form embodiment 100C. As with embodiment 100B of FIG. 16, caster 10 can be attached by any known and suitably strong means, non-limiting examples including welding, riveting, press fit, bolts, pins, or clips. While a particular style of prior art caster is illustrated, it should be understood herein that other caster styles, and casters with a different appearance, can be used. In one embodiment, a standard 6 inch caster is replaced with a 5 inch caster wheel diameter, although other sizes and bearing types can be used. This enables use of prior art components while maintaining proper clearance for deployment. In an embodiment, the caster pivot uses ball bearings for smoother and more reliable operation. In this particular embodiment, a smooth, easily turning bearing is advantageous to ensure a proper alignment of wheel 18, as explained further herein. Wheel 18 size can be adapted, particularly when combining a caster 100 of the disclosure with a flip jack of any design, in order establish or restore proper working height of the relative parts In FIG. 26, carriage brace 540 can be seen connected to carriage 508, thereby configured to constrain and prevent excessive relative lateral movement between ram 506 and carriage 508 during operation of embodiment 100C. Brace 540 can be used with all embodiments herein which have an open sided carriage. Brace 540 can additionally be seen in FIG. 32, in an alternative embodiment of the disclosure.

Additionally shown in FIGS. 26, 31A-31B, and 34 is a ram brace 550, having the form of a block 552 insertable or formed within a distal end of carriage 508, block 552 having formed therein a channel 554 shaped to receive an and of ram 506, to further prevent lateral movement of ram 506 relative to carriage 508. Block 552 may be formed of any material of sufficient strength in order to retain ram 506 and bear the weight imposed upon the jack. Channel 554 has a depth sufficient to impart a significant restraint on lateral movement of ram 506, but to enable an end of ram 506 to be released and to change angle with respect to carriage 508 during deployment of the jack, as described herein. Ram brace 550 can be used with all embodiments described herein. FIG. 31 illustrates a more detailed view of ram brace 550, in which channel 554 and a central post 556 are shown. It should be understood that ram 506 may be received within block 552 without the presence of central post 556, however additional stability may be provided if ram 506 is stabilized on internal and external surfaces thereof.

In FIG. 31B, an alternative ram brace 550B of the disclosure, usable in the manner described for brace 550, includes a taller central post 556B configured to insert a distance within ram 506, to thereby provide additional stability. A brace channel 558 is provided to admit passage of pivot pin 512, particularly when pivot pin 512 is configured to pass through an aperture close to a distal end of ram 506.

In accordance with the disclosure, channel 514 can be lengthened or otherwise modified to optimize performance during use with either caster 100 or caster 10. In one embodiment, channel 514 is lengthened to enable cylinder 506 to extend further along the length of carriage 508. In one embodiment, the prior art ram 506 includes an aperture at a distal end. It is possible, in accordance with the disclosure, to use this standard aperture in lieu of a requirement by the consumer to form an additional aperture further from the distal end, as is required, for example, for use of the FASTWAY jack. This requirement is avoided by providing a lengthened channel 514, as shown in FIG. 26, and by providing a wider spacer 516. A plurality of spacers of different thicknesses can be provided with a device of the disclosure, to enable proper fitment with a variety of jacks.

Referring now to FIGS. 27-30, it may be seen that embodiment 100C is deployed in a manner similar to that described with respect to FIGS. 9-12, with the front of the trailer indicated by arrow "F". However, caster 10 of embodiment 100C has an inherent weight imbalance due to an axle which is offset with respect to a pivot axis of the caster. This biases wheel 18 towards the Earth when the caster is held in the orientation shown in FIG. 27. Accordingly, when embodiment 100C is about to be deployed, absent bearing friction or interference from other objects, caster 10 can be expected to have the orientation shown in FIG. 27. The functionality of carriage 508 is otherwise the same as described for FIGS. 9-12 as ram 506 is extended. As carriage 508 rotates about an axis defined by pivot pin 512, wheel 18 follows a path indicated by arc "C", in FIG. 28, maintaining its initial orientation due to gravity. When wheel 18 contacts travel surface 440, it is pressed against surface 440 by the weight of carriage 508, which can now slide with respect to ram 506 due to pivot pin 512 being free to move within pivot channel 514. The deployment illustrated in FIGS. 27-30 depicts a jack connected to an A-frame trailer configuration, although it should be understood that the embodiments of the disclosure can be utilized with central mounts, such as on an A-frame trailer, or in offset mounts.

When pivot pin 512 reaches the end of pivot channel 514, the weight of the trailer is transferred to carriage 508 and caster 10. Because carriage 508 is three sided, it is desirable for any lateral relative movement between carriage 508 and ram 506 to be restrained by the closed side 518 of carriage 508, which has the greatest strength. Because the axle at bearing 12 is offset towards the front of the trailer, caster 10 is urged to rotate in the direction indicated by arrow "G" and thus to transfer this rotational angular force to carriage 508. Thus, the stability of ram 506 is increased through an increased relative lateral pressure urging ram 506 towards the closed side 518 of channel 508.

A widened spacer 516 is illustrated in FIGS. 26-30, and is provided where a caster of the disclosure is connected to a FASTWAY Jack Foot, such as is described in U.S. Patent Application 2011/0215286. In such embodiments, it is advantageous to use a stock aperture found in most jack pistons 506 which is about 1 inch lower than is required by the FASTWAY jack. Use of the existing lower aperture does require spacer 516, of a similar extra thickness as compared to the distance between the stock and recommended boreholes, in order to restore a proper flip operation of this embodiment. Different sized spacers can be used to accommodate various existing jack devices in a similar manner.

With reference to FIG. 32, it may be seen that, in accordance with the disclosure, caster 10 or caster 100 of the disclosure can be connected to an alternative form of flip jack 660 to form embodiment 100D. Connection between caster 10 or 100 and jack 660 can be made as described with respect to embodiment 100C, and this connection can similarly be formed during or after manufacture of jack 660. While a caster 100 of the disclosure is illustrated, it should be understood that all casters of the disclosure or the prior art can be used in this embodiment. Jack 660 corresponds to that disclosed in U.S. Pat. No. 8,783,716, the contents of which are incorporated by reference herein. Jack 660 is sold by the assignee of the '716 patent, Atwood Mobile Products, LLC, of Elkhart, Ind., and is marketed as the ROBOFOOT retractable jack foot. Embodiment 100D of FIG. 32 operates as described in the '716 patent, modified as described with respect to either FIGS. 9-12 or FIGS. 27-30, herein, wherein chassis 508A is substituted for chassis 508, and otherwise includes ram 506A, pivot ring 60, and associated components, as described in the '716 patent. It may be seen that carriage brace 540 has been connected to carriage 508A, although this is not required for operation of embodiment 100D. Ram brace 550 may be secured within a distal end of carriage 508A as described for other embodiments herein.

In FIG. 33, caster 100 is provided with a decorative object 244, in this embodiment in the form of a frog, to conceal an increased size, or otherwise improve the appearance of, frame leg 202. Decorative object 244 can alternatively be formed with sufficient weight that it can substitute for, or complement the weight of, weight 240. The subject matter for object 244 can be selected for based upon the types of recreation or industry within which caster 100 is to be sold, including, for example, a deer, fish, or other wild animal, or a company logo or personalized tag.

FIG. 35 illustrates a jack foot embodiment corresponding to carriage 508, as described in U.S. Patent Application 2011/0215286, connected to a prior art caster 10, using methods described herein, to form embodiment 100E, which functions as shown and described in FIGS. 26-28.

FIG. 36 illustrates an alternative pivot pin 512A, which can be quickly connected and released without requiring tools. More particularly, a head portion 562 of bolt 560 has a flattened profile which may be grasped by the hand of a user. A wing nut 564 may be threaded onto pin 512A after pin 512A has been passed through a flip carrier (e.g. 508, 508A) and a jack ram 506. There is generally no need for pin 512A to be tightly fastened, but it is important that pin 512A does not withdraw from engagement between ram 506, channel 514, and carriage 508. Accordingly, a cotter pin 568, in this example a spring, or R-type cotter pin, is insertable through a portion of bolt 560 which extends beyond threaded wing nut 564. To promote reliable use of cotter pin 568, a lanyard 570 can be used to secure cotter pin 568 to bolt 560 during and after use. Pivot pin 512A can additionally be used in place of locking pin 242.

All references cited herein are expressly incorporated by reference in their entirety. It will be appreciated by persons skilled in the art that the present invention is not limited to what has been particularly shown and described herein above. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

What is claimed is:

1. A wheel assembly for movingly supporting a vehicle having a longitudinal axis defining a forward and reverse direction of travel along a surface, the assembly comprising:
   a bearing;
   a wheel rotatable in connection with the bearing to be rotatable about a single axis of rotation; a pivot connectable to the vehicle; and
   a frame connected to the pivot sized and dimensioned to support the bearing at an offset with respect to the pivot axis of the pivot to thereby form caster trail, the frame having a mass distributed non-symmetrically with respect to a plane radially bisecting a circumference of the wheel, to thereby cause the frame to pivot about the pivot axis due to gravity to an orientation with the single axis of rotation of the wheel parallel to the longitudinal axis of the vehicle when the wheel assembly is tilted to lift the wheel from contact with the surface, whereby when the wheel assembly is tilted to place the wheel into contact with the surface, the wheel is oriented sideways with respect to the forward and reverse direction of travel of the vehicle, thereby configured to brake movement of the vehicle along the forward and reverse direction of travel of the vehicle.

2. The assembly of claim 1, wherein the frame is cast to distribute the mass.

3. The assembly of claim 1, wherein the mass of the frame includes a weight connected to the frame.

4. The assembly of claim 3, wherein the weight is releasably connectable to the frame.

5. The assembly of claim 3, wherein a position of the weight is adjustable with respect to the frame.

6. The assembly of claim 1, wherein the frame comprises a fork having a plurality of legs, and wherein a weight of a fork leg is different relative to another fork leg.

7. The assembly of claim 1, wherein the bearing is an axle.

8. The wheel assembly of claim 1, further including a carriage connectable to the vehicle, the pivot connected to the carriage, whereby when the wheel assembly is raised and lowered, the carriage causes tilting of the wheel assembly.

9. The wheel assembly of claim 1, further including a flip jack foot, the wheel assembly connectable to the flip jack foot to cause the wheel assembly to be tilted when the wheel assembly is raised and lowered.

10. A method for movingly supporting a vehicle having a longitudinal axis defining a forward and reverse direction of travel along a surface, the method comprising:
   connecting a wheel assembly to the vehicle to be moved, the wheel assembly including—
      a bearing;
      a wheel rotatable in connection with the bearing to be rotatable about a single axis of rotation;
      a pivot connectable to the vehicle; and
      a frame connected to the pivot sized and dimensioned to support the bearing at an offset with respect to the pivot axis of the pivot to thereby form caster trail, the frame having a mass distributed unequally upon left and right sides of the wheel assembly, thereby causing the frame to pivot about the pivot axis due to gravity to an orientation with the single axis of rotation of the wheel parallel with the longitudinal axis of the vehicle when the wheel assembly is tilted to lift the wheel from contact with the surface, whereby when the wheel assembly is tilted to place the wheel into contact with the surface, the wheel is oriented sideways with respect to the forward and reverse direction of travel of the vehicle, thereby configured to brake movement of the vehicle along the forward and reverse direction of travel.

11. The assembly of claim 10, wherein the frame is cast to distribute the mass.

12. The assembly of claim 10, wherein the mass of the frame includes a weight connected to the frame.

13. The assembly of claim 12, wherein the weight of the portion of the wheel assembly forward of a pivot axis of the pivot is equal to a weight of the portion of the wheel assembly aft of the pivot axis, thereby balancing the wheel assembly fore and aft.

14. The assembly of claim 12, further including adjusting a position of the weight with respect to the frame to attain the desired orientation when the frame is tilted.

15. A trailer stand for supporting a trailer having a longitudinal axis defining a forward and reverse direction of travel along a surface, comprising:
   a carriage tiltably connectable to the trailer;
   a wheel assembly including—
      an axle;
      a wheel rotatable in connection with the axle to be rotatable about a single axis of rotation;
      a pivot connected to the carriage; and
   a frame connected to the pivot sized and dimensioned to support the bearing at an offset with respect to the pivot axis of the pivot to thereby form caster trail, the frame having a mass distributed unequally upon left and right sides of the wheel assembly, to thereby cause the frame to pivot about the pivot axis due to gravity to an orientation with the single axis of rotation of the wheel parallel to the longitudinal axis of the vehicle when the wheel assembly is tilted to lift the wheel from contact with the surface, whereby when the wheel assembly is tilted to place the wheel into contact with the surface, the wheel is in a non-rotating orientation with respect to the forward and reverse direction of travel of the vehicle, thereby configured to brake movement of the vehicle along the forward and reverse direction of travel of the vehicle.

16. The stand of claim 15, further including a piston assembly affixed to the trailer and the carriage, the carriage configured to cause the wheel assembly to tilt with respect to the trailer as the piston is moved with respect to the trailer.

17. The stand of claim 15, further including a jack assembly connected to the trailer and having a driving assembly and a piston, the carriage pivotally connected to the piston.

18. The stand of claim 17, the pivotal connection between the carriage and the piston including a pivot pin, the carriage including a non-linear slot in which the pivot pin moves to thereby cause a change in angular orientation of the carriage as the piston is driven.

19. The stand of claim 15, the wheel assembly connected to the distal end of the carriage by at least one of a bolted connection and welded connection.

20. The stand of claim 17, further including a brace affixed to and projecting from a lower end of the carriage, the brace sized and dimensioned to mate with the piston to brace the piston.

21. The method of claim 15, further including connecting the wheel assembly to a carriage which is configured to tilt in connection with a piston, when the piston is raised and lowered with respect to the vehicle.

22. The wheel assembly of claim 20, the brace defining a central post sized to be inserted into an interior of the piston, and an outer channel sized to receive an outer diameter of the piston.

23. The wheel assembly of claim 18, wherein the pivot pin has a threaded end having an aperture, and a head at and end opposite the threaded end, the wheel assembly further including:
   a cotter pin sized to be insertable into the aperture in the threaded end;
   a lanyard connected at one end to the pivot pin head and at an opposite end to the cotter pin;
   a wing nut threadable onto the threaded end of the pivot pin;
   wherein the cotter pin is insertable into the aperture after the wing nut has been threaded onto the threaded end.

24. The wheel assembly of claim 15, the carriage forming a U-shaped channel having a closed side and an open side, the wheel assembly further including a brace extending across the open side of the channel.

* * * * *